(12) United States Patent
Fasold et al.

(10) Patent No.: US 9,680,169 B2
(45) Date of Patent: Jun. 13, 2017

(54) HUMIDIFICATION DEVICE, IN PARTICULAR FOR A FUEL CELL

(71) Applicant: MANN+HUMMEL GMBH, Ludwigsburg (DE)

(72) Inventors: Michael Fasold, Auenwald (DE); Heinz Dobusch, Freudental (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 95 days.

(21) Appl. No.: 14/633,608

(22) Filed: Feb. 27, 2015

(65) Prior Publication Data

US 2015/0171442 A1 Jun. 18, 2015

Related U.S. Application Data

(63) Continuation of application No. PCT/EP2013/067496, filed on Aug. 23, 2013.

(30) Foreign Application Priority Data

Aug. 30, 2012 (DE) .......................... 10 2012 017 139

(51) Int. Cl.
*H01M 4/00* (2006.01)
*H01M 8/04119* (2016.01)
(Continued)

(52) U.S. Cl.
CPC ...... *H01M 8/04149* (2013.01); *B01D 63/085* (2013.01); *B01D 69/10* (2013.01); *B01F 3/04007* (2013.01); *B01D 61/36* (2013.01); *B01D 63/082* (2013.01); *B01D 2319/04* (2013.01); *B01F 2215/0098* (2013.01); *B64D 2013/0662* (2013.01); *H01M 2008/1095* (2013.01)

(58) Field of Classification Search
CPC .... B01D 61/36; B01D 63/082; B01D 63/085; B01D 2319/04; B64D 2013/0662; Y02E 60/50; H01M 2008/1095; B01F 3/04007
See application file for complete search history.

(56) References Cited

U.S. PATENT DOCUMENTS 5,395,429 A 3/1995 Sutsko et al.
6,106,964 A * 8/2000 Voss .................. H01M 8/04119
429/413

(Continued)

*Primary Examiner* — Mark F Huff
*Assistant Examiner* — Monique Wills
(74) *Attorney, Agent, or Firm* — James Hasselbeck

(57) ABSTRACT

A humidification device is provided with at least one stacked unit of water vapor-permeable membranes and of support frames. The support frames are stacked on each other. The membranes each are positioned between two of the support frames, respectively, and have edges clamped between the two support frames. The membranes are arranged parallel and spaced apart relative to each other. Between the two support frames, a supply air flow path extends on a first lateral face of the membrane and, angularly displaced to the supply air flow path, an exhaust air flow path extends on a second lateral face of the membrane facing away from the first lateral face. A flow opening of the supply air flow path and a flow opening of the exhaust air flow path are delimited by the two support frames and extend parallel to a plane of the membrane clamped between them.

12 Claims, 3 Drawing Sheets

(51) Int. Cl.
    *B01D 69/10*     (2006.01)
    *B01F 3/04*     (2006.01)
    *H01M 8/1018*     (2016.01)
    *B64D 13/06*     (2006.01)
    *B01D 61/36*     (2006.01)
    *B01D 63/08*     (2006.01)

(56) References Cited

U.S. PATENT DOCUMENTS

| | | |
|---|---|---|
| 7,670,402 B2 | 3/2010 | Miller |
| 8,091,868 B2 | 1/2012 | Robb |
| 8,317,907 B2 | 11/2012 | Martinchek |
| 2003/0051451 A1* | 3/2003 | Kusunose ............... F24F 3/14 55/320 |
| 2005/0042494 A1 | 2/2005 | Yuh |
| 2007/0261555 A1* | 11/2007 | Aubert ................ B03C 3/12 96/66 |
| 2008/0001313 A1 | 1/2008 | Zhang |
| 2012/0181712 A1 | 7/2012 | Vanderwees et al. |
| 2012/0304977 A1* | 12/2012 | Gao ............... F24H 3/0417 126/112 |
| 2016/0138817 A1* | 5/2016 | Hamlin ............. B01D 53/263 95/52 |

* cited by examiner

HUMIDIFICATION DEVICE, IN PARTICULAR FOR A FUEL CELL

CROSS-REFERENCE TO RELATED APPLICATIONS

This application is a continuation application of international application No. PCT/EP2013/067496 having an international filing date of 23 Aug. 2013 and designating the United States, the International Application claiming a priority date of 30 Aug. 2012, based on prior filed German patent application No. 10 2012 017 139.0, the entire contents of the aforesaid international application and the aforesaid German patent application being incorporated herein by reference.

BACKGROUND OF THE INVENTION

The invention concerns a humidification device, in particular for a fuel-cell, comprising a stacked unit that contains several water vapor-permeable membranes which are arranged parallel and spaced apart relative to each other, wherein the membranes are secured on support frames which are stacked on each other.

A humidification device is disclosed, for example, in EP 1 261 992 B1 according to which the humidification device is correlated with a fuel cell and serves for enriching an air stream that is supplied to the fuel cell system with moisture. The humidification device comprises a water vapor-permeable membrane which is clamped between frame parts wherein the air streams with different moisture contents, between which a moisture exchange is to take place across the membrane, are passed through cutouts in the frame parts which extend perpendicular to the plane of the membrane.

SUMMARY OF THE INVENTION

It is the object of the invention to provide a humidification device of a constructively simple configuration with which an air stream can be enriched with moisture and which contains several water vapor-permeable membranes which are arranged in support frames.

This object is solved according to the invention in that between two support frames a supply air flow path extends on a lateral face of the membrane and, angularly displaced thereto, an exhaust air flow path extends on the opposite lateral face of the membrane, wherein a flow opening of the supply air flow path and a flow opening of the exhaust air flow path are delimited by the support frames and extend parallel to the plane of the membrane. The dependent claims provide expedient further embodiments.

Flow air can be enriched with moisture with the aid of the humidification device according to the invention. The humidification device comprises at least one stacked unit with several water vapor-permeable membranes which are arranged parallel and spaced apart relative to each other. Supply air which is to be enriched with moisture is flowing along a lateral face of the membrane. Exhaust air which dispenses moisture through the water vapor-permeable membrane is flowing along the oppositely positioned lateral face of the membrane. The membranes each extend between two support frames stacked on each other and are clamped at the edges between the support frames. The support frames including the membranes are stacked on each other and form the stacked unit. The support frames can be connected to each other.

By enriching the air stream with moisture, a required minimum moisture contents is achieved. The humidification device is preferably used for a fuel cell in which, by an electrochemical reaction, electrical current is produced by using the flowing air that is enriched with moisture. The membranes of the humidification device are permeable for water vapor but not for air so that, through the membranes, a water exchange exclusively from the air stream with higher moisture to the air stream with lower moisture is realized which is supplied to the fuel cell as supply air. The stacked unit can optionally comprise a great number of membranes including support frames. The humidification device can optionally receive several stacked units within a housing.

For example, the use of the humidification device for enriching breathing air in closed spaces or cabins is conceivable, for example, in airplanes or motor vehicles, as a further application possibility. The humidification device can also be employed in case of dehumidification of exhaust gas streams in industrial applications.

The membranes each are arranged between two support frames wherein, for each membrane, on a first lateral face a supply air flow path and on the oppositely positioned lateral face an exhaust air flow path is formed. The supply air flow path as well as the exhaust air flow path have correlated therewith flow openings in the support frames by means of which the respective supply air or exhaust air can flow in or flow out. The flow openings are delimited by the two support frames, correlated with an intermediately positioned membrane, and extend parallel to the plane of the membrane. The supply air flow path and the exhaust air flow path extend at an angle relative to each other, i.e., these flow paths thus cross each other.

This configuration has the advantage that the flow opening and the supply air flow path have the same orientation so that the supply air flow, upon passing through the flow opening, does not experience a change in direction in a plane that is parallel to the membrane. This applies expediently to the inflow opening as well as the outflow opening of the supply air flow.

The exhaust air flow path is also positioned in the same orientation as its correlated flow opening so that no change of direction in the flow is required in a plane that is parallel to the membrane. For the exhaust air flow, it is expedient that the inflow opening as well as the outflow opening are positioned on oppositely located lateral areas of the support frames in the same orientation as the exhaust air flow so that neither upon inflow into the stacked unit nor upon outflow from the stacked unit a change in direction in a plane that is parallel to the membrane is required. Since changes in direction do not occur in a plane that is parallel to the membrane or are at least reduced, the flow resistance through the humidification device is reduced also.

The flow openings are located in the outwardly positioned support frames wherein, as a result of the angled arrangement of the flow paths for the supply air and the exhaust air, the stacked unit is flowed through by the supply air and the exhaust air via sides that are angularly displaced relative to each other. This facilitates the connection to a pipe system or flow system.

In principle, at least one of the flow openings of the supply air flow as well as of the exhaust air flow can be completely or partially introduced into only one of the support frames. For example, the inflow opening as well as the outflow opening for the supply air flow are provided in one of the support frames while the inflow opening as well as the outflow opening for the exhaust air flow are provided in the second support frame. In principle, it is also possible to have embodiments in which also the respectively other support frame partially delimits at least one flow opening of the supply air flow and/or of the exhaust air flow.

The membrane which is secured between the two support frames is advantageously clamped with form fit between the support frames. In this context, form fit is provided by a form-fit connection that comprises a first form-fit part on a first support frame that engages form-fittingly a second form-fit part of the form-fit connection on the second support frame, wherein the membrane is clamped between the first and the second form-fit parts. The form-fit parts of the form-fit connection on the first and on the second support frames are, for example, configured in accordance with the tongue-and-groove principle. This tongue-and-groove connection comprise a groove in one of the support frames into which a projection on the other support frame engages, wherein the membrane is clamped by the projection in the groove. Clamping of the membrane is realized preferably in the same way on both opposite sides in the support frame. At the angularly displaced lateral areas, the membrane is expediently also clamped with form fit between the support frames, preferably in the same way. By means of the differently positioned flow openings on the angularly displaced sides on the support frames, inflow at the membrane occurs at the top side or bottom side. The form-fit clamping action expediently also achieves a flow-tight sealing action.

The stacked support frames are advantageously connected to each other by form fit. The form fit is realized by a form-fit connection preferably in both directions parallel to the plane of the membrane or the plane of the support frames. The support frames may also be connected to each other with form fit in the direction orthogonal to the plane of the membrane or the support frames, for example, in that the stacked support frames have form-fit members in the form of staggered webs arranged staggered relative to each other and engaging in orthogonal direction from behind. The form-fit connection between the support frames, in particular in orthogonal direction, can be produced optionally in that the staggered webs that are arranged staggered relative to each other are connected by a form-fit element that is embodied as an additional component. The form-fit element can be, for example, an elongate body such as a rod or the like which is placed in the plane or parallel to the plane of the membrane between the webs that are arranged staggered relative to each other.

Form fit can also be produced by a form-fit connection comprising a locking hook provided on a first support frame and a correlated locking recess on a second support frame, wherein the locking hook engages the correlated locking recess. The locking hook is preferably designed to be bendable and can bend elastically during the engaging process and, after engagement has been realized, can return into its initial position so that an accidental release of the support frames from each other is reliably prevented.

According to a further expedient embodiment, the membrane is supported on a support lattice which imparts additional stability to the membrane. The support lattice is secured on one of the support frames and can be optionally designed monolithically with the support frame. Conceivable is also an embodiment of the support lattice as a component that is separate from the support frame and that is connected to a support frame or is clamped between two support frames.

BRIEF DESCRIPTION OF THE DRAWINGS

Further advantages and expedient embodiments can be taken from the dependent claims, the figure description, and the drawings.

In the Figures, same components are provided with same reference characters.

DESCRIPTION OF PREFERRED EMBODIMENTS

Figure 1:
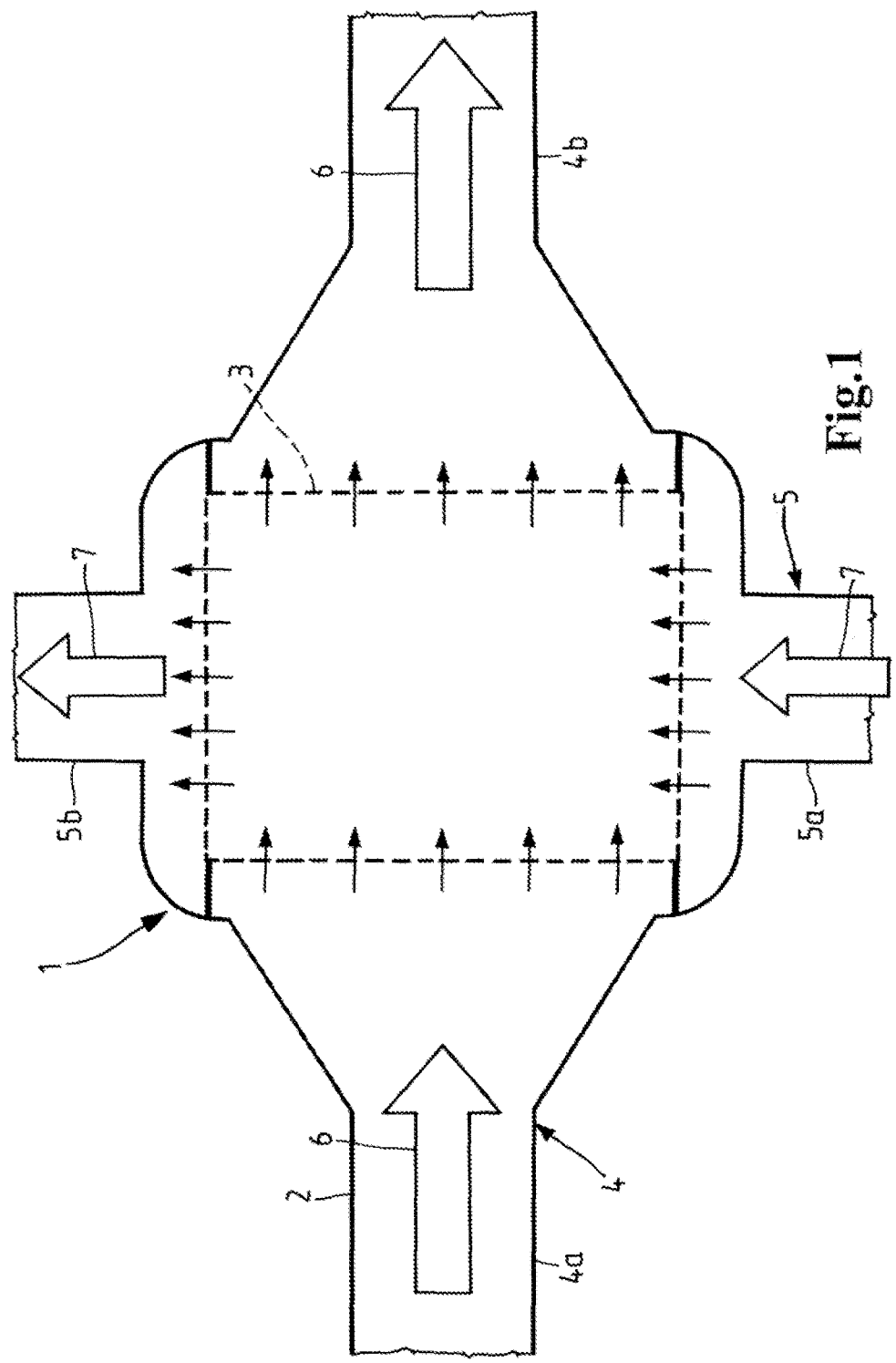
FIG. 1 is a plan view of a humidification device for a fuel cell with a housing in which a stacked unit with several stacked water vapor-permeable membranes is received.

In FIG. 1, a humidification device 1 for a fuel cell is illustrated by means of which fresh air enriched with moisture and having a minimum moisture contents is supplied to the fuel cell. The humidification device 1 comprises an exchangeably inserted cartridge 3 in a housing 2 which serves to transfer the moisture contained in an exhaust gas stream to a dry fresh air stream which is supplied to the fuel cell. The cartridge 3 comprises a stacked unit with a plurality of water vapor-permeable membranes stacked on top of each other.

The housing 2 of the humidification device 1 is provided with a supply air or fresh air channel 4 by means of which ambient air is supplied as fresh air. The supply air channel 4 comprises a supply section 4a upstream of the cartridge 3 as well as a discharge section 4b downstream of the cartridge.

Displaced at a 90° angle relative to the supply air channel 4, the housing 2 is provided with an exhaust air channel 5 by means of which exhaust air of the fuel cell which is enriched with moisture is being guided through the cartridge. The exhaust air channel 5 comprises a supply section 5a upstream of the cartridge 3 and a discharge section 5b downstream of the cartridge.

The supply air stream 6 and the exhaust air stream 7 cross in accordance with the orientation of the channels 4 and 5 at a 90° angle but the air streams 6 and 7 within the cartridge 3 are separated by the water vapor-permeable membranes which permit only water transfer from the exhaust air stream 7 laden with a high moisture contents onto the dry supply air stream 6.

Figure 2:
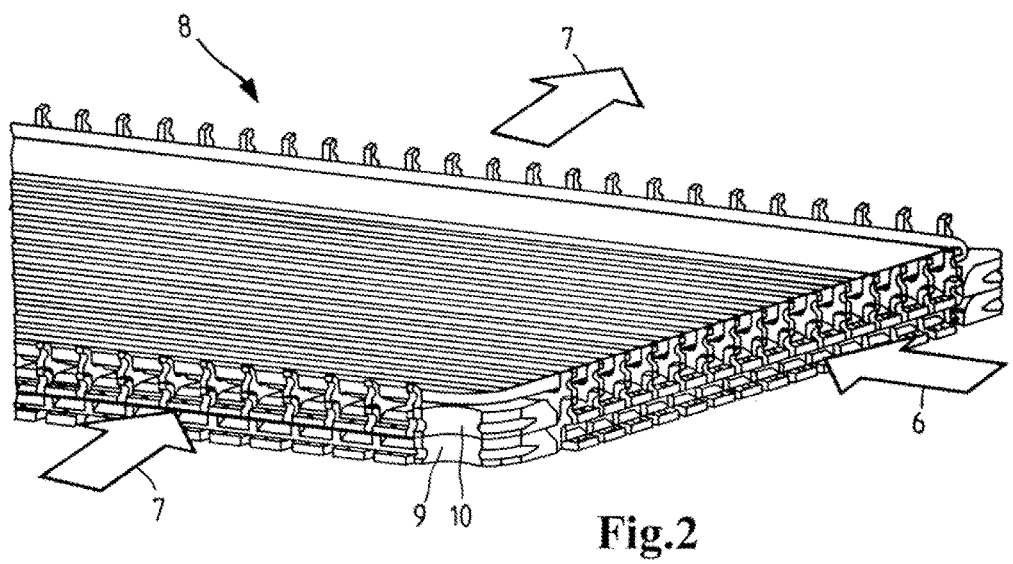
FIG. 2 is a perspective view of a stacked unit of the humidification device with several stacked support frames between which a water vapor-permeable membrane is arranged, respectively.

In FIG. 2, a stacked unit 8 with two support frames 9 and 10 stacked on each other is illustrated between which a water vapor-permeable membrane 12 is clamped. In upward and downward direction, further support frames adjoin wherein a membrane is always arranged between two support frames stacked on each other. Flow through the stacked unit 8 is realized in cross-flow as indicated by arrows 6 and 7; the supply air stream 6 and the exhaust air stream 7 extend at a 90° angle relative to each other. At the exterior sides of the support frames 9 and 10, there is a plurality of form-fit members by means of which the support frames are form-fittingly secured in the plane of the support frames or the membrane as well as in orthogonal direction thereto which is at the same time the direction of assembly or stacking direction of the support frames 9 and 10.

Figure 3:
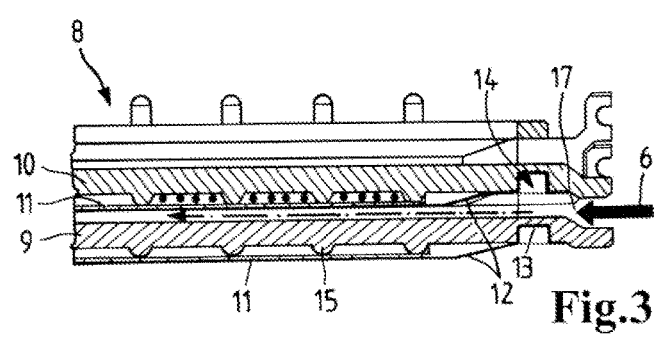
FIG. 3 is a section through the stacked unit in a first plane.
Figure 4:
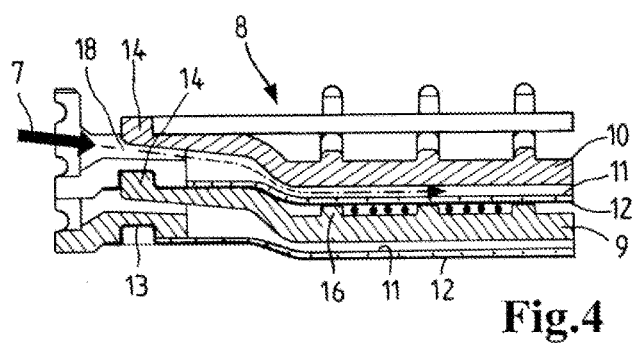
FIG. 4 is a section through the stacked unit in a further plane.

In FIGS. 3 and 4, a section through the stacked unit 8 is illustrated, respectively, wherein the sections are located in different planes that are perpendicular to each other. In FIG. 3 the supply air stream 6, in FIG. 4 the exhaust air stream 7 is illustrated, in each case along the membrane 12, wherein the supply air stream 6 and the exhaust air stream 7 extend on oppositely positioned lateral faces of the membrane 12 as well as orthogonal to each other. In the illustration according to FIGS. 3 and 4, the supply air stream 6 flows below the membrane 12, the exhaust air stream 7 above the membrane 12. Shown in FIGS. 3 and 4 is also a support lattice 11 which is also secured on the support frames or between support frames and is correlated with one membrane. The support lattice 11 imparts additional stability to the membrane 12. The support lattice 11 can be formed monolithic with a support frame; also conceivable is however an embodiment as a separate component that is secured on a support frame or clamped between two support frames.

The membrane 12 is clamped between the two support frames 9 and 10. In the rim area of the support frames 9, 10, form-fit parts are provided for this purpose which are embodied as a groove 13 and a projection 14, wherein the projection 14 engages the groove 13 and thereby clamps the intermediately positioned membrane 12. On each support frame 9, 10, there is a groove 13 as well as a projection 14, respectively, wherein the projection 14 on one support frame engages the groove 13 on the support frame positioned above. The grooves 13 and the projections 14 are designed to extend circumferentially so that a flow-tight sealing action of the interior spanned by the membrane 12 relative to the environment is provided.

On the support frames 9, 10, guiding ribs 15, 16 can be integrally formed which support the support lattice 11 or the membrane 12.

In the lateral area of the support frames 9, 10, flow openings 17 or 18 are formed by means of which the supply air stream 6 or the exhaust air stream 7 flows into the stacked unit 8 or out of the stacked unit. The flow openings 17 and 18 are located at the inflow side as well as at the outflow side. The flow openings 17 and 18 extend at least approximately parallel to the plane of the membrane 12 so that no, or only a minimal, change of direction for the supply air flow and the exhaust air flow is required for inflow, flow through the stacked unit, and outflow.

Figure 5:
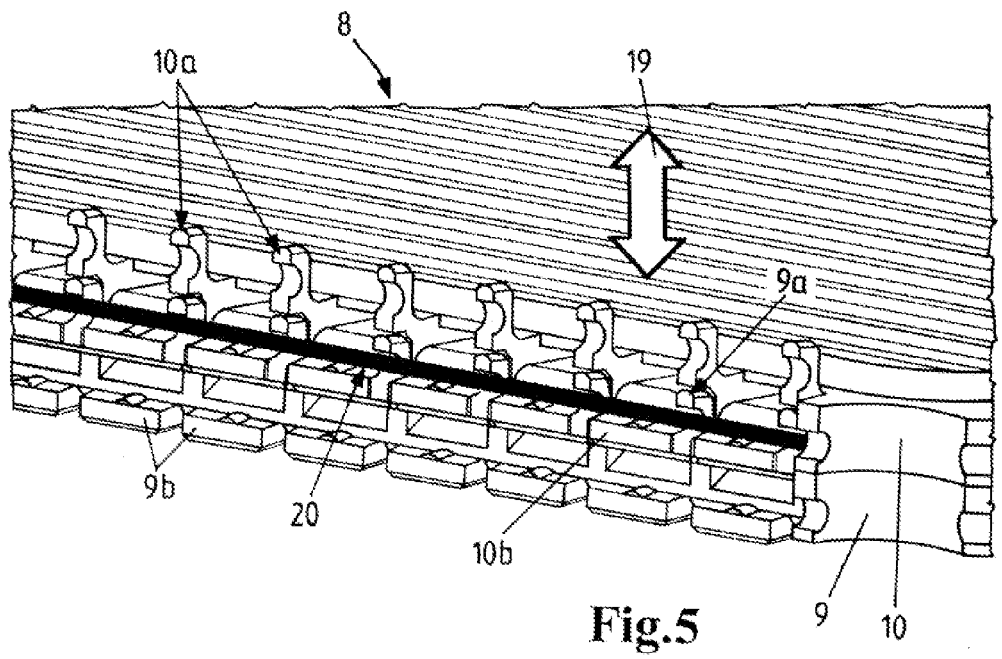
FIG. 5 shows in an enlarged illustration the lateral area of the stacked unit with support frames form-fittingly connected to each other.

In FIG. 5, the form-fit connection between stacked support frames 9 and 10 is illustrated. In the rim area, the support frames 9, 10 each have form-fit members in the form of webs 9a, 9b, 10a, 10b, wherein the webs 9a, 10a are provided in a staggered arrangement and project into the plane of the neighboring support frame. The webs 9b, 10b have the function of retaining webs. In the mounted state, an engagement of the retaining webs 10b from behind by the webs 9a is realized in this way in orthogonal or mounting direction 19. A rod or the like is inserted into the undercut as an additional separately embodied form-fit element 20 so that a detachment in the mounting direction 19 of the support frames 9 and 10 is precluded. For demounting, first the form-fit element 20 must be removed and, subsequently, the support frames 9 and 10 can be disengaged from each other.

Figure 6:
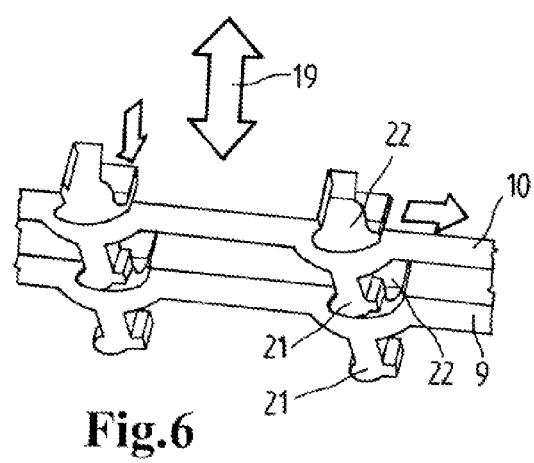
FIG. 6 shows the lateral area of the stacked unit with form-fittingly connected support frames in a further embodiment.

In FIG. 6, a further form-fit connection between the support frames 9 and 10 is illustrated. In the mounting direction 19, a locking hook 21 that is designed to be bendable is formed on the support frame. The locking hook 21 has correlated therewith a locking recess 22 on the other support frame, respectively, in which the locking hook 21 engages lockingly in the mounted state. For producing the form-fit locking connection, the locking hook 21 can be elastically bent. On the locking hook 21 and in the locking recess 22, ramps can be formed which during the process of engagement generate a defined bending movement of the locking hook 21 until the latter has reached its final locked position and, as a result of its own elasticity, assumes its original position in which the locking connection is produced.

While specific embodiments of the invention have been shown and described in detail to illustrate the inventive principles, it will be understood that the invention may be embodied otherwise without departing from such principles.

What is claimed is:

1. A humidification device comprising:
    at least one stacked unit comprising water vapor-permeable membranes and support frames;
    wherein the support frames are stacked on each other;
    wherein the membranes each are positioned between two of the support frames, respectively, and have edges that are clamped between said two support frames;
    wherein the membranes are arranged parallel and spaced apart relative to each other;
    wherein between said two support frames a supply air flow path extends on a first lateral face of the membrane clamped between said two support frames and, angularly displaced to the supply air flow path, an exhaust air flow path extends on a second lateral face of the membrane, wherein the first lateral face and the second lateral face are facing away from each other;
    wherein a flow opening of the supply air flow path and a flow opening of the exhaust air flow path are delimited by said two support frames and extend parallel to a plane of the membrane clamped between said two support frames;
    wherein the support frames stacked on each other are connected to each other by a form-fit connection, respectively;
    wherein the from-fit connection comprises a form-fit element,
    wherein the support frames stacked on each other comprise webs that are arranged staggered relative to each other and form form-fit members of the form-fit connection, and
    wherein the form-fit element extends along the staggered webs.

2. The humidification device according to claim 1, wherein
    the flow opening of the supply air flow path and the flow opening of the exhaust air flow path are provided in one of said two support frames.

3. The humidification device according to claim 1, wherein
    the flow opening of the supply air flow path is provided in a first one of said two support frames and a flow opening of the exhaust air flow path is provided in a second one of said two support frames.

4. The humidification device according to claim 1, wherein
    the membrane clamped between said two support frames is clamped by a second form-fit connection.

5. The humidification device according to claim 4, wherein
    the second form-fit connection is a tongue-and-groove connection of said two support frames.

6. The humidification device according to claim 1, wherein the supply air flow path and the exhaust air flow path are angularly displaced relative to each other by 90 degrees.

7. The humidification device according to claim 1, wherein
the form-fit connection acts in a direction orthogonal to the plane of the membranes.

8. The humidification device according to claim 1, wherein
the form-fit connection comprises a bendable locking hook on a first one of said two support frames and a locking recess on a second one of said two support frame,
wherein the locking hook engages the locking recess.

9. The humidification device according to claim 1, further comprising
a support lattice secured on one of the support frames, respectively, and adapted to support one of the membranes.

10. The humidification device according to claim 9, wherein
the support lattice is formed monolithically with the support frame.

11. The humidification device according to claim 1, further comprising
a housing,
wherein the at least one stacked unit is disposed in the housing.

12. A fuel cell comprising a humidification device according to claim 1.

\* \* \* \* \*